N. COOPER.
STEAM BOILER OR FLUID HEATER.
APPLICATION FILED NOV. 29, 1915.

1,210,766.

Patented Jan. 2, 1917.
6 SHEETS—SHEET 1.

WITNESSES:
George Whigelt
Lydia Grauer

INVENTOR
Nathan Cooper
BY
Israel Benjamins
ATTORNEY

N. COOPER.
STEAM BOILER OR FLUID HEATER.
APPLICATION FILED NOV. 29, 1915.

1,210,766.

Patented Jan. 2, 1917.
6 SHEETS—SHEET 4.

WITNESSES:
George Whigelt
Lydia Grauer

INVENTOR
Nathan Cooper
BY
Israel Benjamins.
ATTORNEY

N. COOPER.
STEAM BOILER OR FLUID HEATER.
APPLICATION FILED NOV. 29, 1915.
1,210,766.
Patented Jan. 2, 1917.
6 SHEETS—SHEET 5.
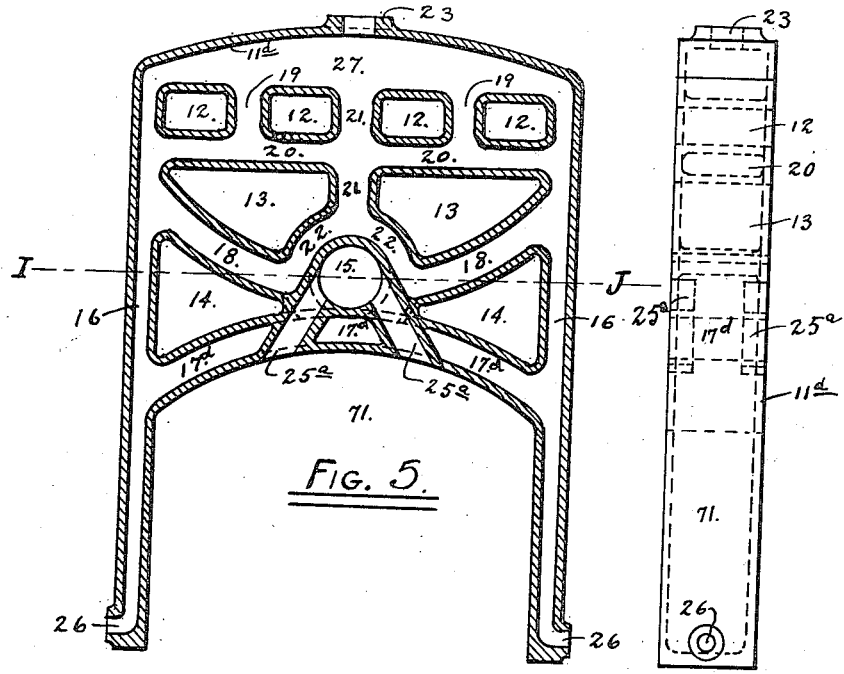
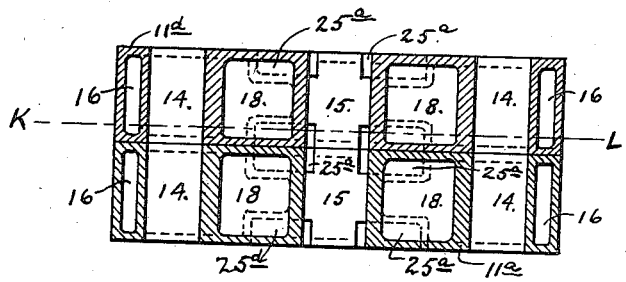
WITNESSES:
George Whigelt
Lydia Grauer
INVENTOR
Nathan Cooper
BY
Israel Benjamins
ATTORNEY

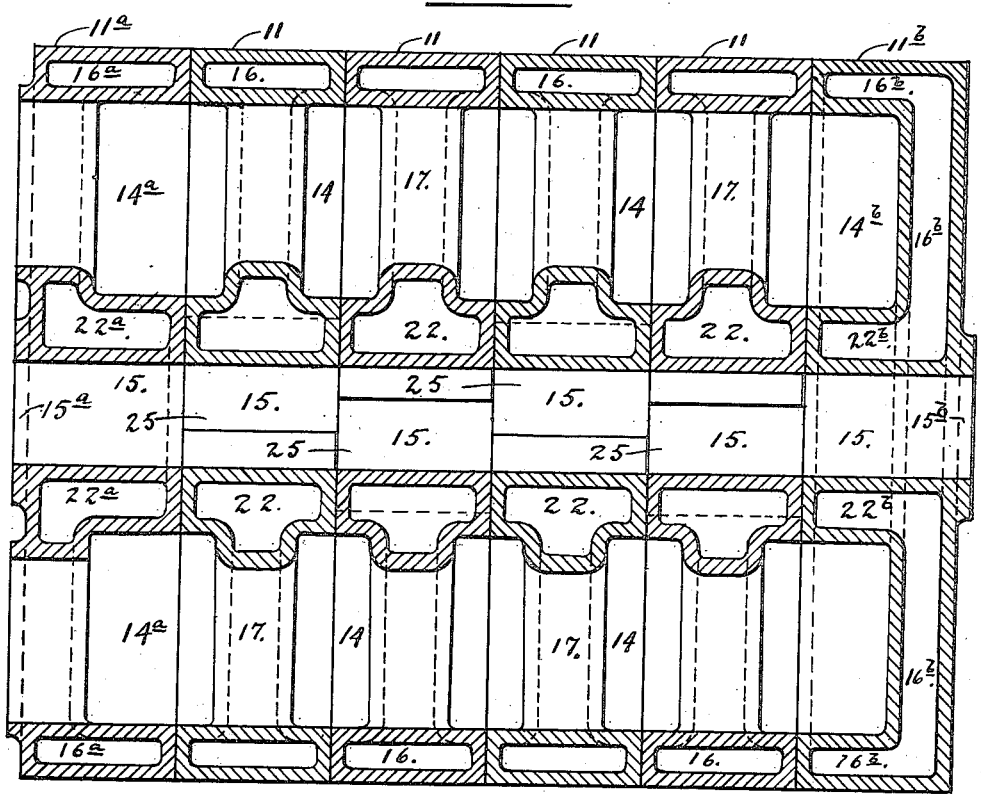

UNITED STATES PATENT OFFICE.

NATHAN COOPER, OF BROOKLYN, NEW YORK.

STEAM-BOILER OR FLUID-HEATER.

1,210,766.  Specification of Letters Patent.  Patented Jan. 2, 1917.

Application filed November 29, 1915. Serial No. 64,197.

*To all whom it may concern:*

Be it known that I, NATHAN COOPER, a citizen of the United States, residing at 401 Blake avenue, Brooklyn, in the county of Kings and State of New York, have invented a new Steam-Boiler or Fluid-Heater, of which the following is a specification.

My invention relates to improvements in sectional steam boilers or fluid heaters commonly employed for heating dwellings and other buildings; and it consists in the novel features hereinafter more fully described.

The objects of my improvement are: First, to produce a steam boiler or fluid heater, which is economical. Second, to have the coal fired into said boiler or fluid heater distributed evenly over the grate, the firing being done mechanically; also to enable firing to be done by hand and to any desired part of the grate area. Third, to have said steam boiler or fluid heater strong, simple, durable and inexpensive. I attain these objects by the steam boiler or fluid heater illustrated in the accompanying drawings or by any mechanical equivalent or obvious modification of the same.

Figure 1:
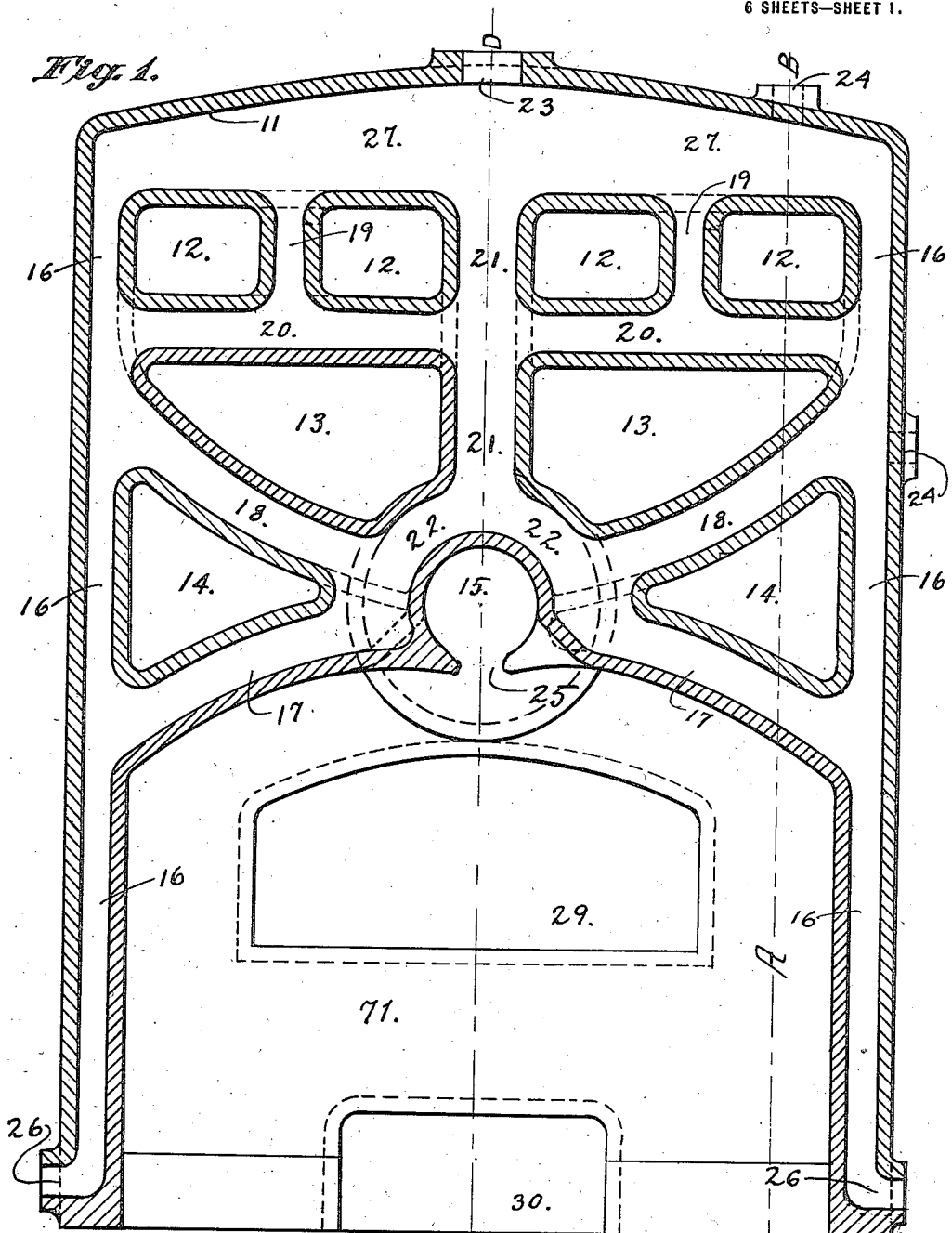
Figure 2:
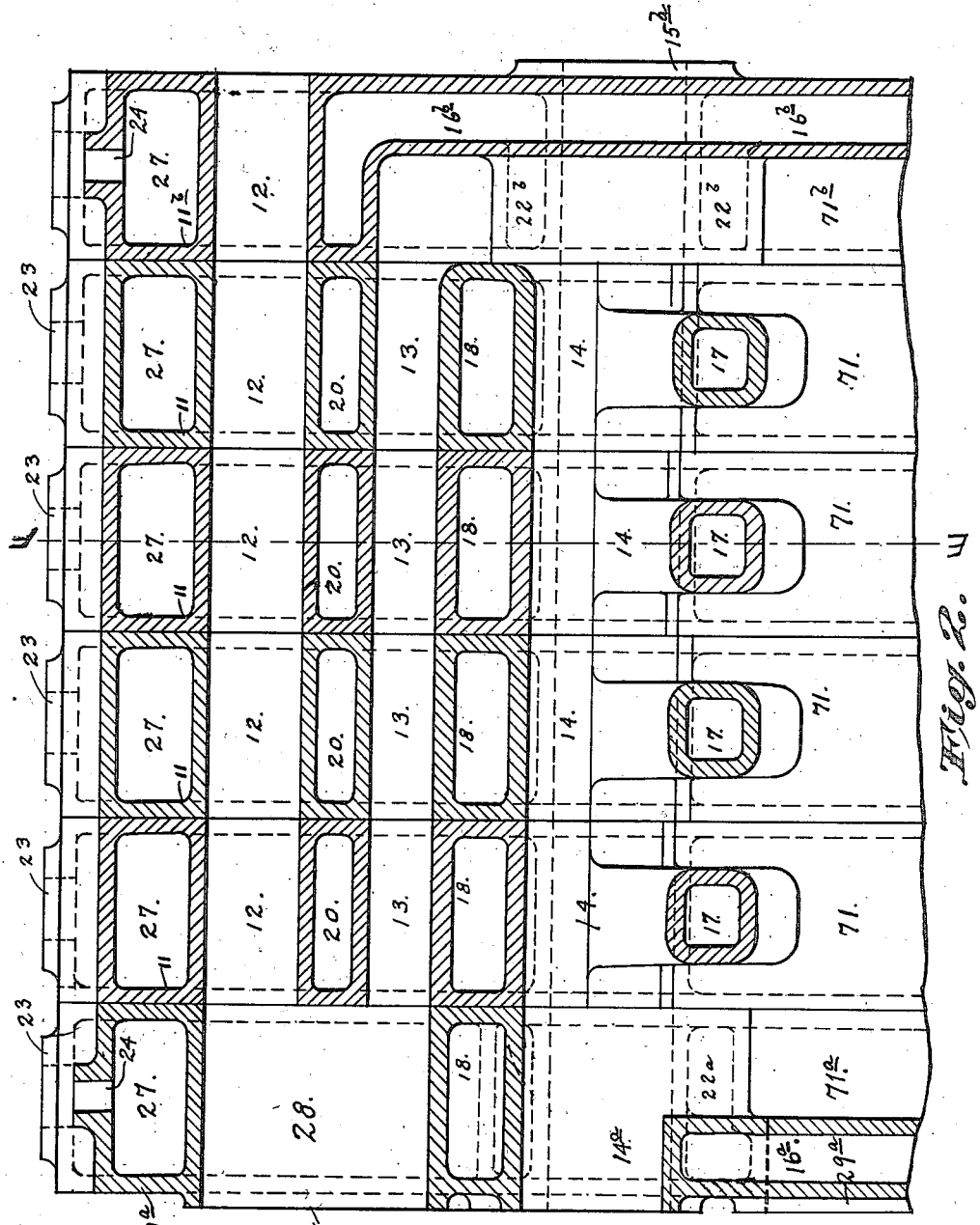
Figure 3:
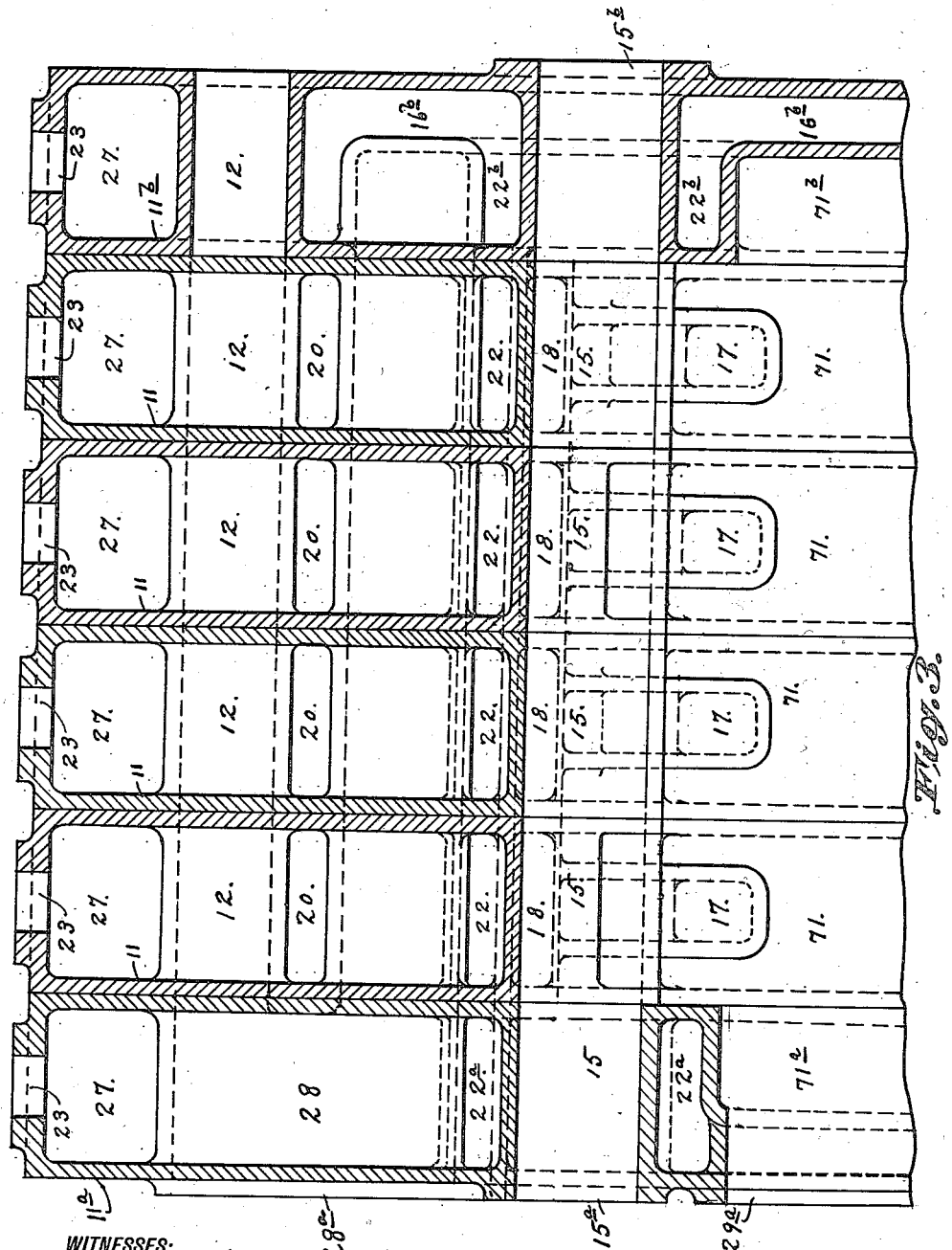
Figure 4:
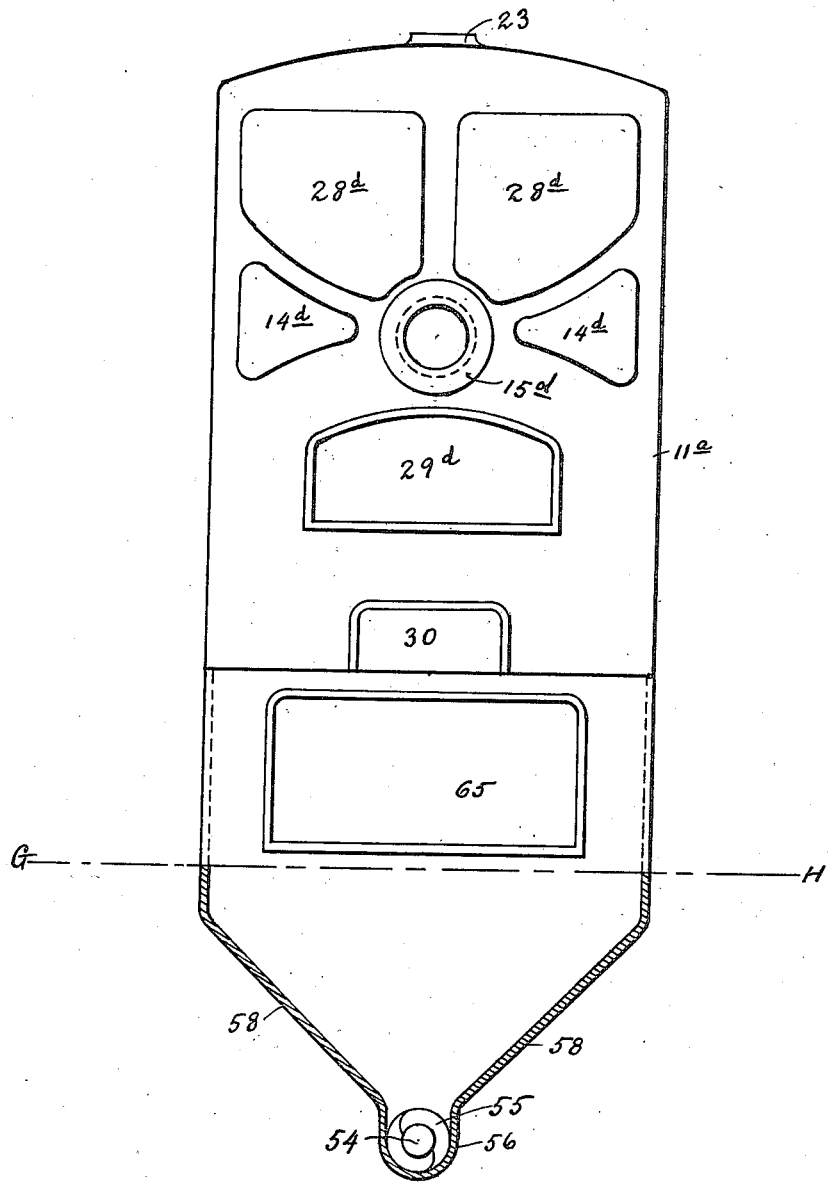

In the drawings Figure 1 is a vertical section on the line E F of Fig. 2. Fig. 2 is a vertical section on the line A—B of Fig. 1. Fig. 3 is a vertical section on the line C—D of Fig. 1. Fig. 4 is a front view of my steam boiler or fluid heater. Fig. 5 is a vertical section of one of the boiler sections of another form of my steam boiler or fluid heater on the line K—L of Fig. 6. Fig. 6 is a horizontal section on the line I—J of Fig. 5, showing two middle boiler sections side by side with the two adjacent openings $25^a$ forming one coal chute, as is hereinafter more fully described. Fig. 7 is a side elevation of one of said boiler sections $11^d$, shown in Figs. 5 and 7. Fig. 8 is a horizontal section of the form of my boiler shown in Figs. 1, 2 and 3 by a plane passing through the axis of the coal feeding duct 15 hereinafter described. Fig. 9 is a plan of three gratings, $25^b$, $25^c$ and $25^d$ respectively, placed in the coal duct 15 in the second, third and fourth middle boiler sections (from the left), above the openings or chutes 25, and shown as detached from the boiler, for the sake of clearness, but in the correct position with relation to said boiler. Fig. 10 is a view from the left of the grating 25, shown without the duct 15, but in the correct relative position thereto, the view being revolved around the horizontal line M—N, passing through the center of the duct 15 transversely thereto, into the plane of the drawing. Fig. 11 is a view from the right of the grating $25^d$, shown with the duct 15, this view being also revolved around said line M—N into a plane parallel to that of the drawing. Fig. 12 is a view from the left of the grating $25^c$ similarly revolved around the line M—N into a plane parallel to the drawing.

Similar numerals and letters refer to similar parts throughout the several views.

11 is each of the middle boiler sections of my steam boiler or fluid heater shown in Figs. 1, 2, 3, and 4, $11^a$ is the front boiler section, and $11^b$ is the rear boiler section. $11^d$ is one of the middle sections of my steam boiler or fluid heater shown in Figs. 5, 6 and 7. Each of these boiler sections is shown as consisting essentially of a steam and water chamber traversed by smoke flues 12 and 13 and smoke passages 14, and embodying the coal duct 15, shown as traversing all the boiler sections horizontally from end to end.

12 are the upper or top flues extending through all the middle boiler sections and also through the rear boiler section, as shown in Fig. 2; the middle boiler sections are shown in Fig. 1 as containing four such top flues; the number may be different, however. In the rear boiler section two or more of these flues may coalesce into one wider flue, if desired.

13 are the intermediate flues, two of which are shown in Figs. 1 and 5; but I do not wish to restrict myself to the exact number or absolute shape of these or any other flues and water passages of my boiler.

14 are smoke passages shown as situated between the water passages 18 above them, which extend each along the full length of the boiler sections, and the water passages 17, extending each along part of the length of the said boiler sections, as shown in Figs. 2 and 3; by the length of the boiler sections I designate the shorter of their three dimensions, which extends along the length of the boiler as assembled. It is evident, therefore, that the smoke passage 14 is continuous on its upper side, under said passages 18, and is intermittent on its lower side over said passages 17, which are enveloped by the gases of combustion, rising from the combustion-chamber 71.

15 is a coal duct formed in each of the boiler sections, and shown as having one or more openings 25 or 25ᵃ toward the combustion chamber 71; these openings are shown in Figs. 1, 2 and 3 as inclined in alternate directions in adjacent middle boiler sections; in the front and rear boiler sections the coal duct 15 is shown without any such openings. In Figs. 5, 6 and 7 the coal duct 15 is shown in each of the middle boiler sections as having two pairs of openings 25ᵃ, inclined in opposite directions; each of said openings 25ᵃ is shown as uninclosed on the edge or side of the boiler section; and adjacent boiler sections join their adjacent openings into coal chutes; in this way the number of coal chutes formed is only two for each middle boiler section, while the number of openings is four in each middle boiler section. Figs. 1, 2 and 3 show these openings or coal chutes 25 to extend along the full length of the coal duct 15 in each middle boiler section; Figs. 5, 6 and 7 show these openings 25ᵃ as occupying each only a fraction or part of the length of the coal duct 15. The front and rear sections of the form of boiler, which corresponds to the sections shown in Figs. 5, 6 and 7, have each two openings, situated at opposite sides thereof and adjacent to the corresponding openings in the middle boiler sections, coalescing therewith into two coal chutes, as is hereinbefore described. 15ᵃ is a connection of said duct 15 of the front boiler section 11ᵃ to a suitable door 15ᵈ shown in Fig. 4, which may be used for cleaning or inspecting said ducts 15, also for hand firing therethrough, if desired. 15ᵇ is a connection of said duct 15 of the rear boiler section 11ᵇ to a suitable coal conduit 36 hereinafter described.

16 are the water legs on each side of said boiler sections 11; 16ᵃ is the boiler shield on the front section 11ᵃ; 16ᵇ is the boiler shield on the rear section 11ᵇ.

22 is a water jacket shown in Fig. 1 as enveloping said coal duct 15 in the middle sections on the top and sides thereof; 22ᵃ and 22ᵇ are water jackets, shown in Figs. 2 and 3 as completely enveloping the coal ducts 15 in the front and rear boiler sections respectively. 17 are curved water passages, shown in Fig. 1 as connecting said water-legs 16 with said water jacket 22; 17ᵈ are the corresponding water passages in the form of my boiler disclosed in Figs. 6, 7 and 8; said passages 17ᵈ are shown in Fig. 5 as connecting the water legs 16 and passing completely under said coal duct 15, and between said openings 25ᵃ; said duct 15 has the portion of its length between said openings 25ᵃ completely enveloped by said jacket 22 above it and said water passages 17ᵈ below it. Said passages 17ᵈ are also communicating with said water jacket 22 between said openings 25ᵃ as shown by dotted lines in Fig. 5.

18 are curved water passages under said flues 13 and above said smoke passage 14. 20 are horizontal water passages between said flues 12 above them and said flues 13 below them, and connecting said water legs 16. 27 is the steam and water space above said flues 12 in each section. 19 are short vertical water passages, connecting said passages 20 and said steam and water space 27, and passing between some of said flues 12. 21 are vertical water passages, connecting said water jackets 22 with said steam and water space 27, and intersecting said passages 20.

23 is a connection to the steam drum, not shown in the drawings; said connection is situated at the apex of each section, as shown in the drawings.

24 are two connections to the water gage shown in Fig. 1 in elevation on the top and side of the front boiler section 11ᵃ; a similar opening is shown in Fig. 2 as located on the top of the rear section 11ᵇ, which opening may be used as a connection for a safety valve, if desired, or for any convenient purpose.

26 is a connection to a water drum at the lower end of each of said water legs 16.

28 are two smoke deflecting chambers, shown as located in the front boiler section 11ᵃ, and serving to pass the smoke from said flues 13 into said flues 12. 28ᵃ is a connection in each of said chambers 28 for a door 28ᵈ, shown in Fig. 4.

29ᵈ is a coal door for hand firing directly onto the grate; it is shown in Fig. 5 in elevation. 29ᵃ is a connection for said door in the front section 11ᵃ, shown in Figs. 2 and 3; this door may be used when the automatic stoker, hereinafter more fully described, is not employed; hand firing may also be done through said ducts 15 and openings 25 or 25ᵃ.

30 is a clinker door in the front boiler section for removing the cinders and clinkers; it is shown in Fig. 5.

To prevent the coal from being delivered in larger quantities in the sections nearest to 15ᵇ than to the sections more remote therefrom, the chutes 25 or 25ᵃ may be partly obstructed by any suitable means, such as a suitable grating, as shown in Figs. 10, 11, 12 and 13; and in those boiler sections that are nearest to said connection 15ᵇ the obstruction could be made greater, so as to get a substantially uniform delivery of coal through all of said chutes.

I prefer to have the middle boiler sections all of the same pattern, for the sake of economy in the cost of the patterns; but they may also be made of different patterns, if desired; in which case the openings 25 or 25ᵃ may be made of a gradually smaller size in the successive boiler sections from the rear end toward the front end of the boiler. The coal drops down from said chutes 25 or 25ª to shaking grate in little heaps, and it is shaken down by the said shaking grate to a fairly uniform level.

Many changes could be made in the design of the details of my steam boiler or fluid heater and in the arrangement of the parts thereof within the scope of my invention. I do not, therefore, restrict myself to the particular form and arrangement of the details as shown in the drawings.

What I claim as my invention, and desire to secure by Letters Patent, is:

1. In a steam boiler or fluid heater, comprising multiple boiler sections and a suitable grate thereunder, a coal feeding duct extending through said sections, said coal feeding duct having inclined chutes adapted to feed coal therethrough to said grate, the inclination of said chutes being in opposite directions, thereby tending to distribute the coal fed therethrough to said grate.

2. In a steam boiler or fluid heater comprising multiple boiler sections and a suitable grate, a coal feeding duct extending through said sections, said duct being cast in one with said sections and containing inclined chutes arranged in pairs, said chutes being adapted to feed coal therethrough to said grate, and the inclination of said chutes being in opposite directions in each pair, thereby tending to distribute the coal fed therethrough to said grate.

3. In a steam boiler or fluid heater comprising multiple boiler sections and a suitable grate thereunder, a coal feeding duct extending through said sections, said duct having inclined chutes arranged in pairs, each pair of said chutes being inclosed by two adjacent boiler sections in the adjoining ends thereof, said chutes being adapted to feed coal therethrough, and the inclination of said chutes being in opposite directions, thereby tending to distribute the coal fed therethrough to said grate.

4. In a steam boiler or fluid heater comprising a front boiler section, a rear boiler section, middle boiler sections and a suitable grate thereunder, a coal feeding duct extending through said sections, forming a continuous passage for the coal propelled therethrough, said duct having chutes adapted to feed coal therethrough to said grate, said middle boiler sections being of substantially the same pattern, and a means for restricting the openings of successive chutes in such a manner as to distribute the coal substantially evenly through all the chutes without varying the patterns of the middle boiler sections.

5. In a steam boiler or fluid heater, comprising a front boiler section, a rear boiler section, middle boiler sections and a suitable grate thereunder, a coal feeding duct extending through said sections, forming a continuous passage for the coal propelled therethrough, said duct having chutes adapted to feed coal therethrough to said grate, said middle boiler sections being of substantially the same pattern, and suitable gratings adapted to restrict the openings of the successive chutes in such a manner as to distribute the coal substantially evenly through all the chutes, without varying the patterns of said middle boiler sections.

6. In a steam boiler or fluid heater comprising multiple boiler sections and a suitable grate, a coal feeding duct extending through said sections from end to end of the boiler, said duct being adapted to be connected at the rear of the boiler to a coal propelling means by a suitable conduit, multiple chutes in said duct, adapted to allow the passage of the coal therethrough to said grate, and a suitable door at the end of said duct, on the front of the boiler, said door being adapted to permit hand firing through said chutes in said duct as an alternative to having said coal propelled through said duct mechanically.

NATHAN COOPER.

Witnesses:
Isaac J. Dukove,
Samuel Kabinowitz.